United States Patent [19]
Aries et al.

[11] 3,738,354
[45] June 12, 1973

[54] TIMER DEVICES FOR CULINARY PURPOSES

[75] Inventors: Graham John Aries, Stourbridge; Brian Scott-Smith, High Wycombe; David Malcolm, Maidenhead, all of England

[73] Assignee: Tower Housewares Limited, Staffordshire, England

[22] Filed: Oct. 18, 1971

[21] Appl. No.: 189,985

[52] U.S. Cl. .................................. 126/388, 236/46
[51] Int. Cl. ........................................... A47j 27/00
[58] Field of Search .................. 126/388; 99/344; 219/506

[56] References Cited
UNITED STATES PATENTS

| | | | |
|---|---|---|---|
| 3,302,001 | 1/1967 | Frazier | 236/46 X |
| 2,192,600 | 3/1940 | Lurtz | 126/388 |
| 1,631,486 | 6/1927 | Hyde | 126/388 |
| 2,536,369 | 1/1951 | Hubbard | 126/388 |

*Primary Examiner*—William F. O'Dea
*Assistant Examiner*—William C. Anderson
*Attorney*—Irvin S. Thompson and Robert J. Patch

[57] ABSTRACT

A culinary timer device comprising a timer mechanism of adjustable operating period incorporated in a cooking vessel or in the cover of such a vessel, a thermo-sensitive device arranged to initiate operation of the timer mechanism when the temperature of the vessel contents reaches a predetermined value, and means for indicating when the operating period has ended.

13 Claims, 4 Drawing Figures

PATENTED JUN 12 1973

3,738,354

PATENTED JUN 12 1973 3,738,354

TIMER DEVICES FOR CULINARY PURPOSES

This invention relates to timer devices for culinary purposes and more particularly relates to timer devices for incorporation in holloware.

The invention is described herein below with particular reference to a pan for use in boiling eggs, although other cooking utensils or covers therefore may be fitted with the device of the invention and may be used for purposes other than the boiling of eggs.

It is well known that the boiling of eggs is often carried out in a rather hit-and-miss manner. For example, either an egg-timer in the form of a sandglass or a convenient time-piece, such as a clock or wrist watch, is used to time the period for which the eggs are to be boiled. In the case of a sandglass, it is difficult to vary the boiling time and consequently the degree to which the eggs are cooked accurately. Also, such sandglasses are usually calibrated for a time period to give a soft-boiled egg starting from the instant at which the water used for cooking the eggs boils. Thus, with a sandglass there exists the possibility of overlooking the beginning of the boiling of the water and therefore the correct zero time at which the glass should be inverted. It is, of course, possible to make a sandglass which has a sufficient time period to allow soft boiling of an egg when the eggs are placed in cold water and the water is then brought to boiling point. However, correct cooking of the eggs in this case depends on the rate at which the temperature of the water is brought to boiling.

The element of error in the second method mentioned above is even higher as, unless the time-piece is constantly watched or incorporates an audible signal mechanism, it is very easy to overlook the end of the cooking period.

According to the present invention, a culinary timer device comprises a timer mechanism having an adjustable operating period and incorporated in a cooking vessel or in the cover of such a vessel, a thermo-sensitive device arranged for monitoring the temperature of the interior of the vessel and connected to the timer mechanism to initiate operation thereof when such temperature reaches a predetermined value, and means for indicating when said operating period has ended.

Although said indication may be purely visual, e.g. a dial of the timer mechanism returning to zero, an audible indication is preferably supplied.

Embodiments of the invention in the form of devices incorporated in the lid of a pan for boiling inter alia eggs and in the wall of a cooking vessel are described below with reference to the accompanying drawings, in which.

Figure 1:
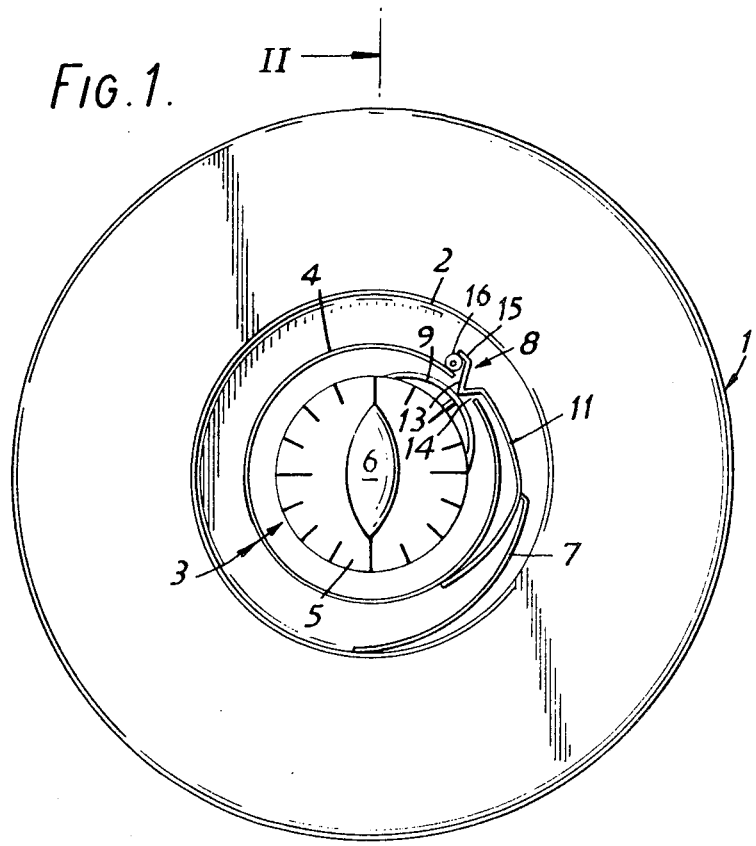
FIG. 1 is a plan view of a pan lid incorporating a timer device embodying this invention.
Figure 2:
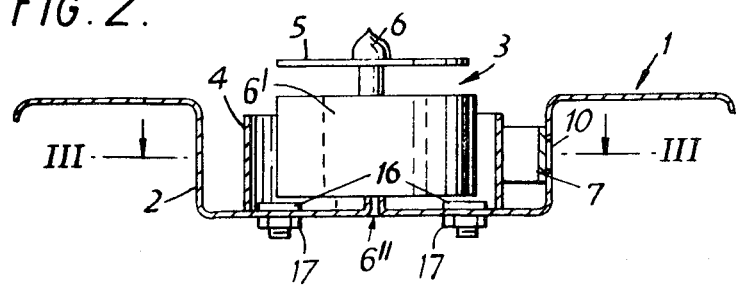
FIG. 2 is a sectional view taken along the line II—II of FIG. 1.

Referring to FIGS. 1 and 2, a pan lid 1 is provided with a central well 2 in which a standard clockwork timer mechanism 3 is fixed by means of its casing 4. The top of the timer mechanism 3 is covered by a disc-like dial member 5 which is calibrated around its periphery in units of time, for example minutes. This disc-like member 5 is connected to the winding shaft of the clockwork mechanism and is rotated in a clockwise direction to wind the mechanism.

The period for which the timer is to operate is set by rotating the member 5 anti-clockwise until the required period is aligned with a reference mark on the lid 1 or on the casing 4 of the timer mechanism. A knob 6 is provided for rotating the member 5 and also serves for removing the lid from the pan. The timer mechanism incorporates an audible warning device 6' which is triggered at the end of the set period.

The audible warning device 6' may be a standard ringing mechanism. Alternatively, it may be a steam whistle in which case an optional aperture 6'' through which steam from the interior of the pan can pass to the whistle is provided, the aperture being opened by the timer mechanism at the end of the set period.

A thermo-sensitive relay 7 consisting of a bi-metallic strip has one end fixed to the wall of the well 2, and the other end attached to a brake arrangement 8 which is capable of preventing rotation of a rotating part of the timer mechanism 3 such as the balance wheel 9. An aperture 10 (FIG. 2) in the wall of the well 2 is covered by the bi-metallic strip so that the temperature of the interior of the holloware vessel can directly affect the strip.

Figure 3:
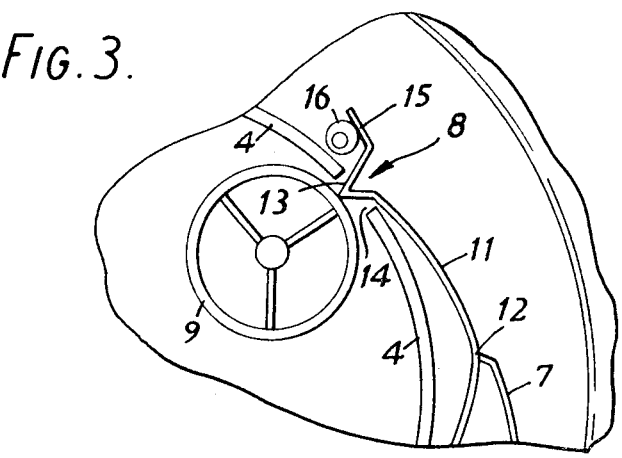
FIG. 3 is a fragmentary sectional view along the line III—III of FIG. 2 on an enlarged scale.

Referring now to FIG. 3, the brake arrangement 8 consists of a strip 11 of springy material such as brass, having one end attached, for example by soldering, to the casing 4 of the timer mechanism 3. The strip 11 is bent so as to form an apex 12 spaced from the casing 4 of the timer mechanism. The other end of the strip 11 is bent to form a V-shaped portion 13, the apex of the V facing the casing of the timer mechanism. An aperture 14 is cut in the casing 4 of the timer mechanism adjacent the balance wheel 9, and the V-shaped portion 13 of the strip 11 is positioned so that when the apex 12 of the strip is forced towards the casing 4, the V-shaped portion 13 enters the aperture 14 and bears on the balance wheel 9, preventing its rotation and thus preventing operation of the timer mechanism.

The radius of curvature of the bi-metallic strip 7 is such that with its free end bearing on the apex 12 of the strip 11 sufficient force is produced to press the V-shaped portion 13 against the balance wheel 9 and thus prevent operation of the timer. As the internal temperature of the vessel rises, the radius of curvature of the bi-metallic relay 7 decreases, thus reducing the force due to the springy nature of the strip 11 holding the hook 13 in contact with the balance wheel 9 until, at the predetermined temperature, the balance wheel is released.

The end of the V-shaped portion 13 is provided with a tail 15 which bears on a screw-operated cam mechanism 16. Rotation of the cam mechanism alters the spacing of the tail 15 from the balance wheel and thus varies the force required to bring the V-shaped portion 13 into contact with the balance wheel 9 and therefore the predetermined temperature at which the timer begins to function.

Figure 4:
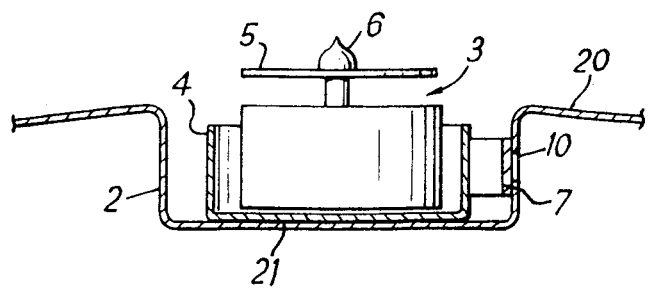
FIG. 4 is a view corresponding to FIG. 2 of a like device fitted in the wall of a cooking vessel rather than in a lid.

FIG. 4 shows a device which is generally the same as that of FIG. 1 – 3 but which is fitted in a well in the wall of a cooking vessel rather than in a lid. Reference numeral 20 designates the part of the wall adjacent the device; the other numerals designate the same items as in FIGS. 1 – 3. With the exception of the manner in which the device is attached to the vessel, the construction and operation of the device of FIG. 4 are the same as those of FIGS. 1 - 3.

The timer mechanism 3 may be fixed in the well 2 in the lid by a nut and bolt arrangement 16, 17 (FIG. 2). It is of course essential that no steam or other vapour be allowed to reach the timer mechanism and, with the fixing as described above, an efficient seal must be provided around the bolts. It is preferable therefore that the timer mechanism be fixed in the well of a lid or a wall of a vessel by a bonding or potting agent such as an epoxy resin 21 (FIG. 4). Any such bonding agent must be capable of withstanding the maximum temperature at which the lid is to be used. With the timer device bonded into the well in this manner, the mechanism is completely shielded from vapour given off by the contents of the vessel, as the only aperture is that in the wall of the well and this is completely covered and sealed by the bi-metallic strip.

Also, the timer mechanism can be completely sealed relative to the upper surface of the lid or the outer surface of the wall of the vessel, thus allowing the lid or vessel to be completely immersed in water for cleansing purposes.

The present invention provides a device by which a selected cooking period which is to commence when the contents of the vessel reach a particular predetermined temperature can be accurately set. The timer device indicates a time period which is adjustable and which starts when the vessel contents reach a predetermined temperature; which temperature can also be adjusted by making the thermosensitive device adjustable.

We claim:

1. A cooking vessel comprising a body, a cover for said body, said body and cover co-operating to define a cooking enclosure, a timer mechanism fitted to said enclosure and having means for adjusting the operating period thereof, a thermo-sensitive device mounted on the outside of said enclosure and arranged to monitor the temperature of the interior of said enclosure, means connecting said thermo-sensitive device to said timer mechanism to initiate operation of the timer mechanism, said thermo-sensitive device being adapted to cause said connection means to initiate operation of said timer mechanism when said temperature reaches a predetermined value, and means for indicating when said operating period has ended.

2. A cooking vessel according to claim 1 in which said timer mechanism includes a rotary part such as a balance wheel and said connecting means comprises a brake arrangement capable of preventing rotation of said rotary part, said thermosensitive device being adapted to cause said brake arrangement to allow rotation of said rotary part when said predetermined temperature is reached.

3. A cooking vessel according to claim 1 in which said brake arrangement comprises a strip of spring material anchored at one end thereof, the other end thereof being adapted to bear on the rotary part and prevent its rotation when pressure is exerted on the strip by said thermo-sensitive device.

4. A cooking vessel according to claim 3 in which said one end of the strip is anchored to said timer mechanism and the strip is bent intermediate its ends to form an apex spaced from the timer mechanism and is provided adjacent said other end with a V-shaped portion, the apex of the V being adapted to bear on said rotary part when the strip is forced towards said timer mechanism.

5. A cooking vessel according to claim 4 further comprising a cam mechanism for varying the force required to bring the apex of said V into contact with said rotary part and thereby varying said predetermined temperature at which operation of said timer mechanism is initiated.

6. A cooking vessel according to claim 5 in which said thermo-sensitive element is a bi-metallic strip.

7. A cooking vessel according to claim 6 in which said timer mechanism is fixed in a well in said enclosure.

8. A cooking vessel according to claim 7 in which the interior wall of said well is provided with an aperture and said bi-metallic strip is fixed to said interior wall so as to cover said aperture.

9. A cooking vessel according to claim 7 in which said timer mechanism is fixed in said well by a bonding agent.

10. A cooking vessel according to claim 9 in which said bonding agent is an epoxy resin.

11. A cooking vessel according to claim 1 in which said means for indicating when said operating period has ended includes an audible warning device.

12. A cooking vessel according to claim 11 in which said audible warning device is a ringing mechanism.

13. A cooking vessel according to claim 11 in which said warning device is a steam whistle; said enclosure defines an aperture for allowing steam to pass from the interior of said enclosure to said whistle; and means is provided for opening said aperture at the end of said operating period.

* * * * *

UNITED STATES PATENT OFFICE
CERTIFICATE OF CORRECTION

Patent No. 3,738,354        Dated June 12, 1973

Inventor(s) GRAHAM JOHN ARIES, ET. AL.

It is certified that error appears in the above-identified patent and that said Letters Patent are hereby corrected as shown below:

On the cover sheet [75], "David Malcolm" should read -- David Malcolm Craton -- . Claim 3, line 1, "claim 1" should read -- claim 2 --.

Signed and sealed this 25th day of December 1973.

(SEAL)
Attest:

EDWARD M. FLETCHER, JR.
Attesting Officer

RENE D. TEGTMEYER
Acting Commissioner of Patents